United States Patent
Zhang et al.

(10) Patent No.: US 10,976,622 B2
(45) Date of Patent: Apr. 13, 2021

(54) DISPLAY PANEL AND MANUFACTURING METHOD THEREOF, AND DISPLAY DEVICE

(71) Applicant: BOE TECHNOLOGY GROUP CO., LTD., Beijing (CN)

(72) Inventors: Pengju Zhang, Beijing (CN); Hao Miao, Beijing (CN); Haiyan Sun, Beijing (CN); Mingxing Liu, Beijing (CN); Hong Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/638,923

(22) PCT Filed: Mar. 28, 2019

(86) PCT No.: PCT/CN2019/080119
§ 371 (c)(1),
(2) Date: Feb. 13, 2020

(87) PCT Pub. No.: WO2019/184986
PCT Pub. Date: Oct. 3, 2019

(65) Prior Publication Data
US 2020/0225547 A1      Jul. 16, 2020

(30) Foreign Application Priority Data
Mar. 30, 2018   (CN) .......................... 201810277212.2

(51) Int. Cl.
*G02F 1/00* (2006.01)
*G02F 1/169* (2019.01)
(Continued)

(52) U.S. Cl.
CPC .. *G02F 1/136286* (2013.01); *G02F 1/133514* (2013.01); *G02F 1/0009* (2013.01);
(Continued)

(58) Field of Classification Search
CPC ........ G02F 1/0009; G02F 1/0018; G02F 1/07; G02F 1/0061; G02F 1/361; G02F 1/169;
(Continued)

(56) References Cited

U.S. PATENT DOCUMENTS

2007/0064178 A1* 3/2007 Murai ............... G02F 1/133784
349/108
2019/0235344 A1   8/2019 Miao et al.
(Continued)

FOREIGN PATENT DOCUMENTS

CN      201867559 U    6/2011
CN      2018867559 U   6/2011
(Continued)

OTHER PUBLICATIONS

Shen, Tian-Zi et. al., "Electro-optical Switching of Graphene Oxide Liquid Crystals with an Extremely Large Kerr Coefficient," Nature Materials, vol. 13, pp. 394-399; published online Mar. 9, 2014. (Year: 2014).*

(Continued)

*Primary Examiner* — Angela K Davison
(74) *Attorney, Agent, or Firm* — Collard & Roe, P.C.

(57) ABSTRACT

A display panel, a manufacturing method thereof and a display device are provided. The display panel includes an array substrate and a color filter substrate disposed oppositely. A light transmission medium layer is provided between the array substrate and the color filter substrate, the light transmission medium layer being made of graphene oxide.

8 Claims, 4 Drawing Sheets

(51) Int. Cl.
*G02F 1/1362* (2006.01)
*G02F 1/1335* (2006.01)

(52) U.S. Cl.
CPC ...... *G02F 1/0018* (2013.01); *G02F 1/136222* (2021.01); *G02F 1/169* (2019.01); *G02F 2201/121* (2013.01); *G02F 2201/123* (2013.01)

(58) Field of Classification Search
CPC ........... G02F 1/133617; G02F 2201/44; H01L 51/50; H01L 51/5012; H01L 51/5024; G09G 3/30
See application file for complete search history.

(56) References Cited

U.S. PATENT DOCUMENTS

| | | |
|---|---|---|
| 2019/0265556 A1 | 8/2019 | Miao et al. |
| 2020/0201118 A1 | 6/2020 | Zhang et al. |
| 2020/0225547 A1 | 7/2020 | Zhang et al. |

FOREIGN PATENT DOCUMENTS

| | | |
|---|---|---|
| CN | 108181734 A | 6/2018 |
| CN | 108333831 A | 7/2018 |
| CN | 108398812 A | 8/2018 |
| CN | 108445650 A | 8/2018 |
| KR | 101759423 B1 | 7/2017 |

OTHER PUBLICATIONS

International Search Report of PCT/CN2019/080119 in Chinese, dated Jul. 10, 2019, with English translation.
Tong liping, liquid crystal properties and photonic crystals of go based materials and their application in the preparation of cross-linked enzyme polymerization, Chinese doctoral dissertation full-text database, engineering science series 1, Nov. 15, 2015, No. 11, p. 10,18, figure 1-20.

\* cited by examiner light direction

DISPLAY PANEL AND MANUFACTURING METHOD THEREOF, AND DISPLAY DEVICE

CROSS REFERENCE TO RELATED APPLICATIONS

This application is the National Stage of PCT/CN2019/080119 filed on Mar. 28, 2019, which claims priority under 35 U.S.C. § 119 of Chinese Application No. 201810277212.2 filed on Mar. 30, 2018, the disclosures of which is incorporated by reference.

TECHNICAL FIELD

Embodiments of the present disclosure relate to a display panel, a manufacturing method thereof, and a display device.

BACKGROUND

A thin film transistor-liquid crystal display (TFT-LCD) includes an array substrate, a liquid crystal layer, and a color filter substrate disposed sequentially.

A TFT-LCD can control the deflection of liquid crystal molecules in the liquid crystal layer by adjusting the strength of the electric field applied to the liquid crystal layer, which in turn adjusts the vibration direction of the light after passing through the liquid crystal layer, so that it displays image.

SUMMARY

Embodiments of the present disclosure provide a display panel, a manufacturing method thereof, and a display device.

At least one embodiment of the present disclosure provides a display panel comprising: an array substrate and a color filter substrate disposed oppositely. A light transmission medium layer is provided between the array substrate and the color filter substrate, the light transmission medium layer being made of graphene oxide.

For example, a plurality of pixel units are disposed on the array substrate and each of the pixel units comprises a drive transistor and a pixel electrode connected with the drive transistor, the pixel electrode is disposed on a side of the light transmission medium layer, and a common electrode is disposed on an other side of the light transmission medium layer.

For example, the display panel further comprises an electrode substrate disposed between the color filter substrate and the light transmission medium layer, the common electrode being disposed on a side of the electrode substrate near the light transmission medium layer.

For example, each of the pixel units further comprises a capacitor, the capacitor including one end connected with the pixel electrode and another end connected with a high frequency signal line configured to provide high frequency voltage signals.

For example, the capacitor is a variable capacitor.

For example, the high frequency signal line is disposed on the array substrate and the high frequency signal line includes an input end connected with a control chip.

For example, the drive transistor includes a gate connected with a gate line, a first pole connected with a data line, and a second pole connected with the pixel electrode; and the high frequency signal line is disposed in parallel with the data line.

For example, the high frequency voltage signal has a frequency range from about 1 kHz to about 100 kHz.

At least one embodiment of the present disclosure provides a manufacturing method of a display panel, comprising: providing an array substrate and a color filter substrate; and filling graphene oxide between the array substrate and the color filter substrate, and obtaining a light transmission medium layer.

At least one embodiment of the present disclosure also provides a display device, comprising any of the display panels.

BRIEF DESCRIPTION OF THE DRAWINGS

Embodiments of the present disclosure will be described in more detail below with reference to drawings to enable one of ordinary skill in the art understand embodiments of the present disclosure more clearly, in which.

DETAILED DESCRIPTION

Technical solutions of the embodiments will be described in a clearly and fully understandable way in connection with the drawings related to the embodiments of the disclosure. It is apparent that the described embodiments are a part but not all of the embodiments of the disclosure. Based on the described embodiments herein, one of ordinary skill in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not preclude other elements or objects. The terms, 'on,' 'under,' or the like are only used to indicate relative position relationship, and when the absolute position of the object which is described is changed, the relative position relationship may be changed accordingly.

The inventor has noticed that a typical high voltage is required to drive liquid crystal molecules to deflect in a thin film transistor liquid crystal display panel (TFT-LCD), which increases the power consumption of the display device.

Figure 1:
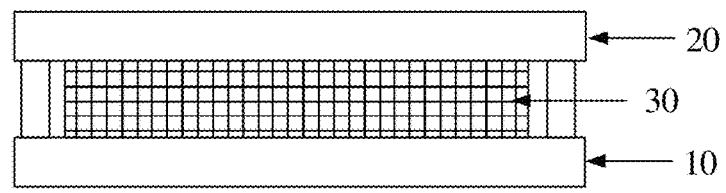
FIG. 1 is a schematically structural diagram of a display panel provided according to an embodiment of the present disclosure.

FIG. 1 is a schematically structural diagram of a display panel provided according to an embodiment of the present disclosure. As shown in FIG. 1, the display panel may include an array substrate 10 and a color filter substrate 20 disposed oppositely.

A light transmission medium layer 30 may be disposed between the array substrate 10 and the color filter substrate 20, which may be made of graphene oxide. The graphene oxide refers to the oxide of graphene and is of a brown suspension liquid with a two-dimensional structure, which indicates a structure in which molecules or atoms are regularly arranged and extend in forward and backward directions of two dimensions in space. The graphene oxide has a strong polarity and a low driving voltage of typically 4V/mm.

Whereas in the technology of adopting liquid crystal layer as the light transmission medium layer, the voltage for driving liquid crystal molecules in the liquid crystal layer to deflect is typically 1V/μm. In this way, the driving voltage for graphene oxide is lower, which reduces the power consumption of the display device.

In the display panel provided in embodiments of the present disclosure, the light transmission medium layer is made of graphene oxide. No liquid crystal molecule layer and the corresponding alignment layer (for reducing the driving voltage and aligning liquid crystal molecules in the liquid crystal layer at a given pre-inclination angle uniformly) are needed, and the voltage required for driving the graphene oxide is low, which lowers the power consumption of the display device and simplifies manufacturing process of the display device.

Furthermore, the liquid crystal molecules are transparent in the technology of disposing liquid crystal layer in the display panel, a polarizer is required to realize the dark state display of the display panel, while the presence of polarizer will reduce the light transmittance of the display panel.

In the display panel provided in embodiments of the present disclosure, graphene oxide is used as the light transmission medium layer. The graphene oxide is a brown suspension liquid that does not transmit light without electric field applied thereon, thus, it is possible to realize the dark state display of the display panel. In this way, no polarizer is required in the display panel, which can improve light transmittance of the display panel and reduce the thickness and manufacturing cost of the display panel.

Figure 2:
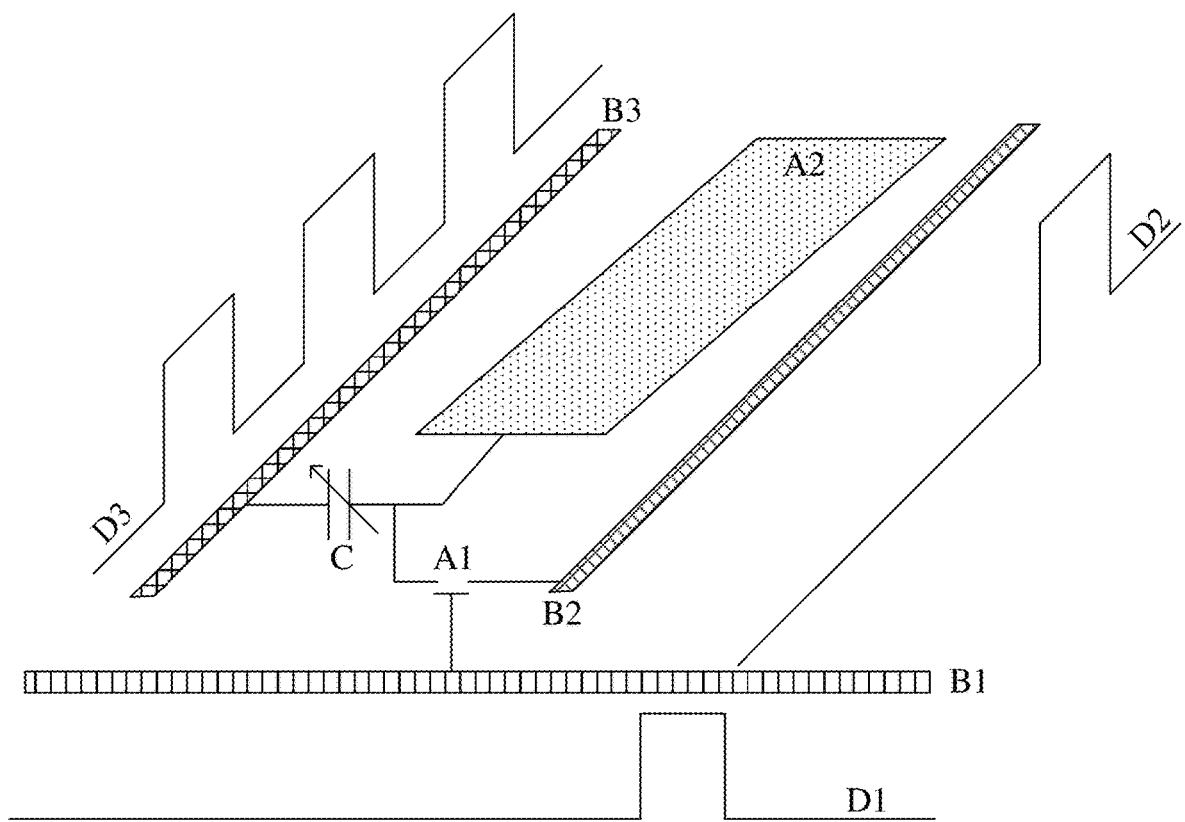
FIG. 2 is a schematically structural diagram of a pixel unit provided according to an embodiment of the present disclosure.

In embodiments of the present disclosure, a plurality of pixel units may be disposed on the array substrate 10. For example, FIG. 2 is a schematically structural diagram of a pixel unit provided according to an embodiment of the present disclosure. With reference to FIG. 2, each pixel unit may include a drive transistor A1 and a pixel electrode A2 connected with the drive transistor A1.

Figure 3:
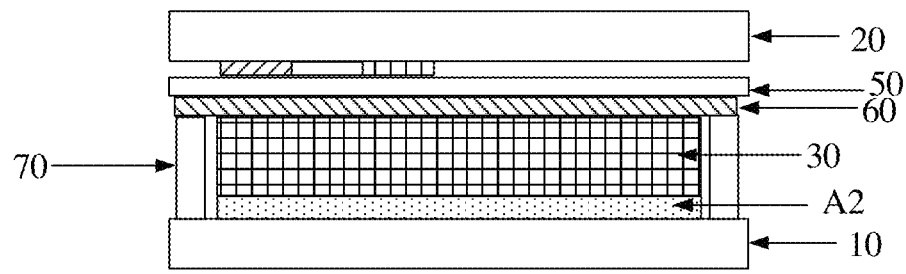
FIG. 3 is a schematically structural diagram of another display panel provided according to an embodiment of the present disclosure.

FIG. 3 is a schematically structural diagram of another display panel provided according to an embodiment of the present disclosure. With reference to FIG. 3, the light transmission medium layer 30 may be disposed on a side of the pixel electrode A2 away from the array substrate 10. On the other side of the light transmission medium layer 30, a common electrode 60 may be disposed for providing a constant reference voltage, which may be about 0 volt.

It is to be noted that, in embodiments of the present disclosure, both the pixel electrode A2 and the common electrode 60 may be made of a transparent material. As an example, both the pixel electrode A2 and the common electrode 60 may be indium tin oxide (ITO) electrodes.

For example, referring to FIG. 2, the drive transistor A1 may have its gate connected with the gate line B1, the first terminal connected with the data line B2, and the second terminal connected with the pixel electrode A2.

The gate line B1 may provide gate driving signals for the drive transistor A1 to drive the drive transistor A1 to turn on. As an example, the timing diagram of the gate driving signals may be as shown by D1 in FIG. 2. A plurality of gate lines are disposed in the array substrate, each gate line being connected with drive transistors in a row of pixel units. The plurality of gate lines are configured to scan rows of pixel units on the array substrate row by row.

The data line B2 may provide a control voltage for the drive transistor A1, which in turn charges the pixel electrode A2. As an example, the timing diagram of the voltage signals of the control voltage may be as shown by D2 in FIG. 2. After the pixel electrode A2 is charged, it may cooperate with the common electrode 60 to drive graphene oxide in the light transmission medium layer 30 to deflect.

For example, as shown in FIG. 3, the display panel may further include an electrode substrate 50 disposed between the color filter substrate 20 and the light transmission medium layer 30, and the common electrode 60 may be disposed on a side of the electrode substrate 50 near the light transmission medium layer 30.

Figure 4:
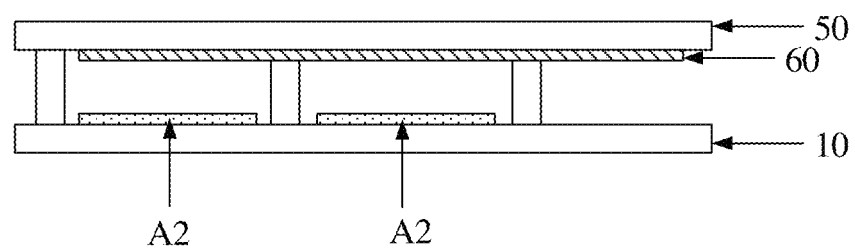
FIG. 4 is a partially structural diagram of a display panel provided according to an embodiment of the present disclosure.

FIG. 4 is a partially schematic structure diagram of a display panel provided according to an embodiment of the present disclosure. As shown in FIG. 4, each pixel unit in the array substrate may be provided with an independent pixel electrode A2. The common electrode 60 is a plate electrode that can form electric fields with each pixel electrode A2, respectively.

For example, as shown in FIG. 2, each pixel unit may further include a capacitor C.

The capacitor C may include one end connected with the pixel electrode A2 and the other end connected with a high frequency signal line B3 for providing high frequency voltage signals.

The capacitor C may be a p-n junction semiconductor variable capacitor that is a capacitor with a capacitance adjustable within a certain range. The formation of the p-n junction semiconductor variable capacitor is integrated with the process of the display panel, which can avoid increasing complexity of the manufacturing process of the display panel. The high frequency signal line B3 may also be disposed on the array substrate 10 and may have the input end connected with a control chip (not shown in FIG. 2) for outputting high frequency voltage signals to the high frequency signal line B3, and the high frequency voltage signals have a frequency range of about 1 kHz to about 100 kHz. For example, the high frequency voltage signals may have a frequency of about 10 kHz. The high frequency voltage signal output by the high frequency signal line B3 may maintain the voltage of the pixel electrode A2 via the capacitor C to keep the dispersability of graphene oxide in turn. As an example, the schematic diagram of the high frequency voltage signals may be as shown by D3 in FIG. 2.

For example, as shown in FIG. 2, the high frequency signal line B3 for providing high frequency voltage signals may be disposed in parallel with the data line B2.

For example, in embodiments of the present disclosure, an electric field may be formed between the pixel electrode A2 in each pixel unit and the common electrode 60 in a direction perpendicular to the carrying surface of the array substrate. The electric field may control the deflection of graphene oxide in the light transmission medium layer 30, and implementing control over the light exiting out of the display panel. For example, it is possible to adjust the magnitude of the capacitor C by adjusting the magnitude of the control voltage provided by the data line B2 so as to adjust the voltage applied on the pixel electrode 102, which in turn adjusts the strength of the electric field and finally adjusts the deflection angle of graphene oxide in the light transmission medium layer 30.

Figure 5:
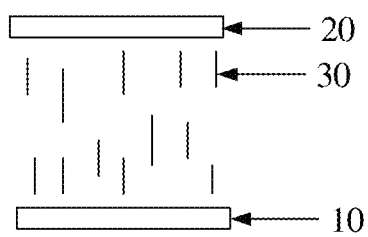
FIG. 5 is a schematic diagram of an arrangement of graphene oxide provided according to an embodiment of the present disclosure.
Figure 6:
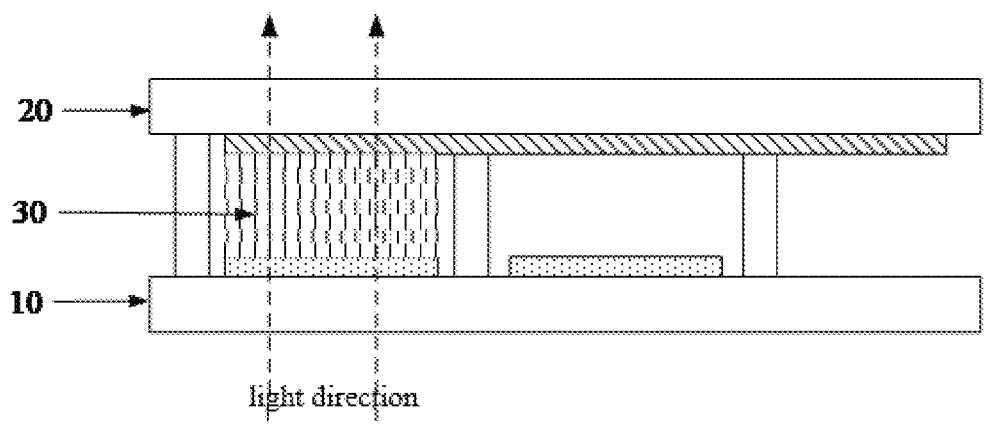
FIG. 6 is a schematically structural diagram of a bright state display panel provided according to an embodiment of the present disclosure.
Figure 7:
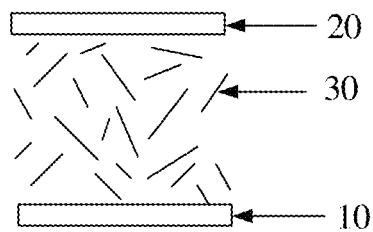
FIG. 7 is a schematic diagram of another arrangement of graphene oxide provided according to an embodiment of the present disclosure.
Figure 8:
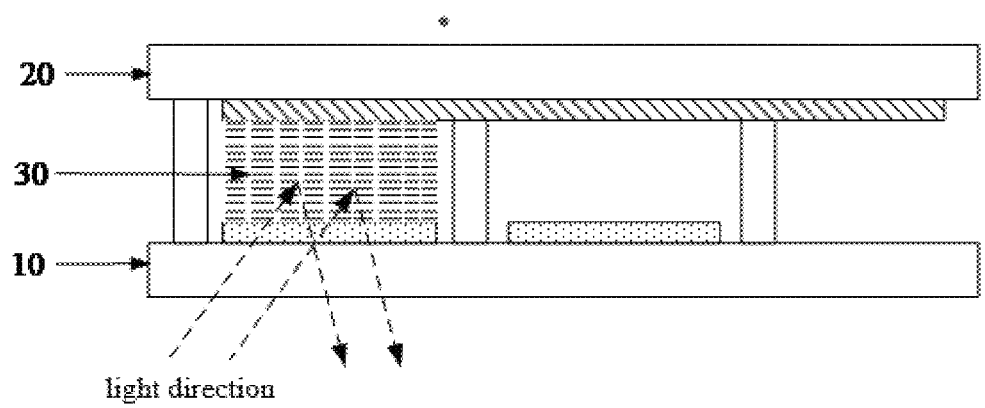
FIG. 8 is a schematically structural diagram of a dark state display panel provided according to an embodiment of the present disclosure.

When the electric field strength is a preset threshold, as shown in FIG. 5, the graphene oxide in the light transmission medium layer 30 is all perpendicular to the carrying surface of the array substrate 10. At this point, as shown in FIG. 6, light may pass through and exit out of the display panel, and the display panel is in the bright state. When the field strength of the electric field is adjusted by adjusting the magnitude of the control voltage, it is possible to adjust the deflection angle of graphene oxide in the light transmission medium layer 30 so as to adjust the intensity of light passing through the light transmission medium layer 30, thereby allowing the display panel to display different gray scales. When the field strength is adjusted to zero, namely no any control voltage is provided by the data line B2, as shown in FIG. 7, graphene oxide in the light transmission medium layer 30 is distributed randomly. At this point, as shown in FIG. 8, light cannot pass through the display panel and the display panel is in the dark state.

In the display panel provided in embodiments of the present disclosure, the light transmission medium layer is made of graphene oxide. In this way, no liquid crystal molecule layer and the corresponding alignment layer (for reducing the driving voltage and aligning liquid crystal molecules in the liquid crystal layer at a certain pre-inclination angle uniformly) are needed, and the voltage required for driving the graphene oxide is low, which lowers the power consumption of the display device and simplifies manufacturing process of the display device.

The liquid crystal molecules are transparent in the technology of disposing liquid crystal layer in the display panel, a polarizer is required to realize dark state display of the display panel, while the presence of the polarizer will reduce the light transmittance of the display panel.

In the display panel provided in embodiments of the present disclosure, graphene oxide is used as the light transmission medium layer. The graphene oxide is a brown suspension liquid, which does not transmit light without an electric field applied thereon, it is possible to realize dark state display of the display panel. In this way, no polarizer is needed in the display panel, which can improve light transmittance of the display panel and reduce the thickness and manufacturing cost of the display panel.

Figure 9:
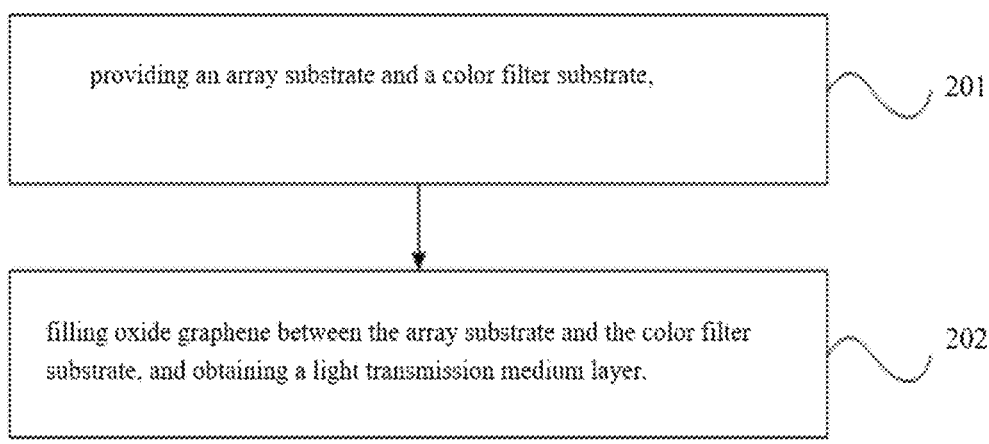
FIG. 9 is a flow chart of a manufacturing method of display panel provided according to an embodiment of the present disclosure.

FIG. 9 is a manufacturing method of display panel provided according to an embodiment of the present disclosure. As shown in FIG. 9, the manufacturing method of display panel may include following operations.

Step 201, providing an array substrate 10 and a color filter substrate 20.

Step 202, filling graphene oxide between the array substrate 10 and the color filter substrate 20, and obtaining the light transmission medium layer 30.

In the above-mentioned step 202, it is possible to apply sealant 70 at the periphery of the array substrate (referring to FIG. 3) and then fill graphene oxide within the sealant 70 to obtain the light transmission medium layer 30. Furthermore, it is possible to form the color filter substrate 20 on one side of the light transmission medium layer 30 away from the array substrate 10.

For example, a plurality of pixel units may be formed on the array substrate 10. Each pixel unit may include a drive transistor A1 and a pixel electrode A2 connected with the drive transistor A1.

The drive transistor A1 may have its gate connected with the gate line B1, the first pole connected with the data line B2, and the second pole connected with the pixel electrode A2.

Pixel electrodes A2 in the pixel units may be formed on a side of the light transmission medium layer 30 near the array substrate 10. On the other side of the light transmission medium layer 30, a common electrode 60 may be formed to provide a constant voltage.

For example, after the light transmission medium layer 30 is formed on the array substrate 10, an electrode substrate 50 may be disposed on a side of the light transmission medium layer 30 away from the array substrate 10, a common electrode 60 is formed on a side of the electrode substrate 50 near the light transmission medium layer 30, and the color filter substrate 20 is disposed on a side of the electrode substrate 50 away from the light transmission medium layer 30.

Furthermore, for example, each pixel unit formed on the array substrate 10 may further include a capacitor C. The capacitor C includes one end connected with the pixel electrode A2 and the other end connected with a high frequency signal line B3 for providing high frequency voltage signals.

The capacitor C may be a p-n junction semiconductor variable capacitor, the variable capacitor is a capacitor with a capacitance adjustable within a given range. The high frequency signal line B3 may be formed on the array substrate 10 and may have its input end connected with a control chip. The control chip is configured to output high frequency voltage signals to the high frequency signal line B3, the high frequency voltage signals have a frequency range from about 1 kHz to about 100 kHz. For example, the high frequency voltage signals may have a frequency of about 10 kHz. The high frequency voltage signals output by the high frequency signal line B3 may maintain the voltage of the pixel electrode A2 via the capacitor C to keep the dispersability of graphene oxide in turn.

The high frequency signal line B3 for providing high frequency voltage signals may be disposed in parallel with the data line B2 on the array substrate 10.

An embodiment of the present disclosure provides a manufacturing method of display panel which can fill graphene oxide between the array substrate and the color filter substrate as the light transmission medium layer. In this way, no liquid crystal molecule layer and the corresponding alignment layer (for reducing the driving voltage and aligning liquid crystal molecules in the liquid crystal layer at a certain pre-inclination angle uniformly) are needed, and the voltage required for driving the graphene oxide is low, which lowers the power consumption of the display device and simplifies manufacturing steps of the display device.

The liquid crystal molecules are transparent in the technology of disposing liquid crystal layer in the display panel, a polarizer is required to realize dark state display of the display panel, while the presence of polarizer will reduce the light transmission of the display panel.

In the display panel provided in embodiments of the present disclosure, graphene oxide is used as the light transmission medium layer. The graphene oxide is a brown suspension liquid, which does not transmit light without an electric field applied thereon, thus, it is possible to realize dark state display of the display panel. In this way, no polarizer is needed in the display panel, which can thereby improve light transmittance of the display panel and reduce the thickness and manufacturing cost of the display panel.

Figure 10:
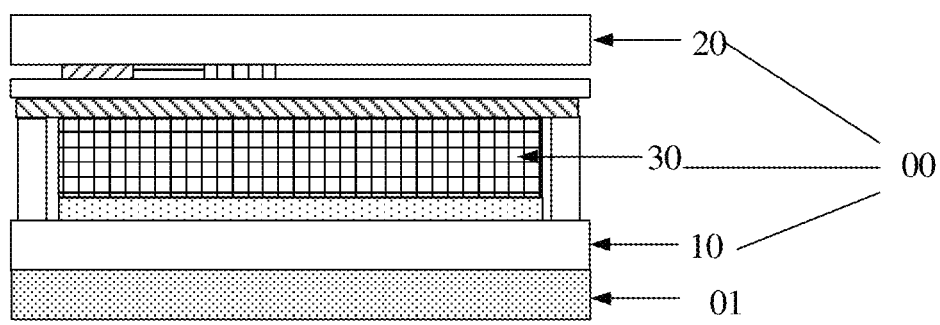
FIG. 10 is a schematically structural diagram of a display device provided according to an embodiment of the present disclosure.

FIG. 10 is a schematically structural diagram of a display device provided according to an embodiment of the present disclosure. Referring to FIG. 10, the display device may include a display panel 00 and a backlight 01. The display panel 00 may be the display panel shown in FIG. 1, FIG. 3, or FIG. 4. The backlight 01 may be disposed on a side of the array substrate 10 away from the color filter substrate 20, and may serve as the light source for the display panel 00.

The display device in embodiments of the present disclosure may be a liquid crystal panel, a piece of electronic paper, an OLED panel, an AMOLED panel, a cell phone, a tablet computer, a TV set, a display, a notebook computer, a digital photo frame, a navigator and any product or component with display function.

The described above is only exemplary embodiments of the present disclosure; and the present disclosure is not limited thereto. Any changes, equivalent substitutions, and modifications without departing from the spirit and principle of the present disclosure shall fall within the scope of the present disclosure.

What is claimed is:

1. A display panel comprising:
   an array substrate and a color filter substrate disposed oppositely;
   a light transmission medium layer provided between the array substrate and the color filter substrate, the light transmission medium layer being made of graphene oxide,
   a plurality of pixel units provided on the array substrate and each of the pixel units comprising a drive transistor and a pixel electrode connected with the drive transistor, the pixel electrode being disposed on a side of the light transmission medium layer, and a common electrode being disposed on an other side of the light transmission medium layer;
   wherein each of the pixel units further comprises a capacitor, the capacitor including one end connected with the pixel electrode and another end connected with a high frequency signal line configured to provide high frequency voltage signals; and
   the drive transistor includes a gate connected with a gate line, a first pole connected with a data line, and a second pole connected with the pixel electrode;
   the high frequency signal line is disposed in parallel with the data line;
   the high frequency voltage signal has a frequency range from about 1 kHz to about 100 kHz.

2. The display panel according to claim 1, further comprising an electrode substrate disposed between the color filter substrate and the light transmission medium layer, the common electrode being disposed on a side of the electrode substrate near the light transmission medium layer.

3. The display panel according to claim 1, wherein the capacitor is a variable capacitor.

4. The display panel according to claim 1, wherein the high frequency signal line is disposed on the array substrate and the high frequency signal line includes an input end connected with a control chip.

5. The display panel according to claim 1, wherein the capacitor is a variable capacitor.

6. The display panel according to claim 5, wherein the high frequency signal line is disposed on the array substrate and the high frequency signal line includes an input end connected with a control chip.

7. A manufacturing method of a display panel, comprising: providing an array substrate and a color filter substrate oppositely; and filling graphene oxide between the array substrate and the color filter substrate, and obtaining a light transmission medium layer; preparing a light transmission medium layer between the array substrate and the color filter substrate, the light transmission medium layer comprising the graphene oxide, providing a plurality of pixel units on the array substrate and each of the pixel units comprises a drive transistor and a pixel electrode connected with the drive transistor, the pixel electrode is formed on a side of the light transmission medium layer, and a common electrode is formed on an other side of the light transmission medium layer; wherein each of the pixel units further comprises a capacitor, the capacitor including one end connected with the pixel electrode and another end connected with a high frequency signal line configured to provide high frequency voltage signals; the drive transistor includes a gate connected with a gate line, a first pole connected with a data line, and a second pole connected with the pixel electrode; the high frequency signal line is disposed in parallel with the data line; and the high frequency voltage signal has a frequency range from about 1 kHz to about 100 kHz.

8. A display device, comprising a display panel, wherein the display panel comprises:
   an array substrate and a color filter substrate disposed oppositely;
   a light transmission medium layer provided between the array substrate and the color filter substrate, the light transmission medium layer being made of graphene oxide,
   a plurality of pixel units provided on the array substrate and each of the pixel units comprising a drive transistor and a pixel electrode connected with the drive transistor, the pixel electrode being disposed on a side of the light transmission medium layer, and a common electrode being disposed on an other side of the light transmission medium layer;
   wherein each of the pixel units further comprises a capacitor, the capacitor including one end connected with the pixel electrode and another end connected with a high frequency signal line configured to provide high frequency voltage signals; and
   the drive transistor includes a gate connected with a gate line, a first pole connected with a data line, and a second pole connected with the pixel electrode;
   the high frequency signal line is disposed in parallel with the data line;
   the high frequency voltage signal has a frequency range from about 1 kHz to about 100 kHz.

* * * * *